United States Patent
Hamano

(10) Patent No.: US 7,791,667 B2
(45) Date of Patent: Sep. 7, 2010

(54) FOCUS DETECTION APPARATUS AND IMAGE-PICKUP APPARATUS INCLUDING THE SAME

(75) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 11/559,997

(22) Filed: Nov. 15, 2006

(65) Prior Publication Data

US 2007/0109440 A1 May 17, 2007

(30) Foreign Application Priority Data

Nov. 16, 2005 (JP) .............................. 2005-331245

(51) Int. Cl.
- G03B 13/00 (2006.01)
- G03B 7/099 (2006.01)
- G03B 3/10 (2006.01)
- G03B 13/34 (2006.01)
- H04N 5/232 (2006.01)
- G02B 7/28 (2006.01)

(52) U.S. Cl. ...................... 348/345; 396/114; 396/121; 396/123

(58) Field of Classification Search ................ 348/345; 396/111–123
See application file for complete search history.

(56) References Cited

U.S. PATENT DOCUMENTS

| | | | | |
|---|---|---|---|---|
| 5,530,513 A | * | 6/1996 | Ohsawa | ...................... 396/121 |
| 5,652,424 A | * | 7/1997 | Moriyama | ................ 250/201.4 |
| 6,643,460 B2 | * | 11/2003 | Uchiyama et al. | ........... 396/114 |
| 7,450,838 B2 | * | 11/2008 | Nonaka | ........................ 396/80 |
| 7,496,290 B2 | * | 2/2009 | Nakata | ........................ 396/123 |
| 7,548,687 B2 | * | 6/2009 | Goto | ........................... 396/114 |
| 2001/0003556 A1 | * | 6/2001 | Ohmura | ....................... 396/114 |

* cited by examiner

Primary Examiner—Jason Chan
Assistant Examiner—Pritham Prabhakher
(74) Attorney, Agent, or Firm—Cowan, Liebowitz & Latman, P.C.

(57) ABSTRACT

A focus detection apparatus is disclosed which can achieve excellent focus detection performance. The apparatus detects the focusing state of an image-pickup lens based on a phase difference in a plurality of images. The apparatus includes a field lens and a light-receiving element including plural focus detection areas. The light-receiving element includes at least first and second focus detection areas which detect a phase difference in a first direction, and third and fourth focus detection areas which detect a phase difference in a second direction. The intersection position of the first focus detection area and the third focus detection area with respect to the center of the first focus detection area is different from the intersection position of the second focus detection area and the fourth focus detection area with respect to the center of the second focus detection area.

9 Claims, 10 Drawing Sheets

FOCUS DETECTION APPARATUS AND IMAGE-PICKUP APPARATUS INCLUDING THE SAME

BACKGROUND OF THE INVENTION

The present invention relates generally to an image-pickup apparatus, and more particularly, to an image-pickup apparatus including a focus detection apparatus which detects the focusing state of an image-pickup optical system. The present invention is preferable for use in a camera and a video camera, for example.

With the widespread use of image-pickup apparatuses typified by a digital camera and a video camera, a higher level of quality and a smaller size are increasingly needed in such image-pickup apparatuses. Particularly, a higher degree of accuracy and a reduced size are required in a focus detection apparatus which detects the focusing state of an image-pickup lens (image-pickup optical system) in an image-pickup apparatus. In recent years, focus detection apparatuses operate predominantly with a TTL phase difference detection method in which the pupil of an image-pickup lens is split into a plurality of areas, luminous fluxes pass through the respective areas and form a plurality of images, and the relative positional relationship between the images is used to detect the focusing state of the image-pickup lens (for example, see Japanese Patent Laid-Open No. S62 (1987)-95511, Japanese Patent Laid-Open No. H09 (1997)-184965, and Japanese Patent Laid-Open No. 2003-107323).

Japanese Patent Laid-Open No. S62 (1987)-95511 has disclosed a focus detection apparatus which uses a focus detection point (cross focus detection point) allowing focus detection in a plurality of directions to ensure high focus detection performance regardless of the spatial pattern of an object. Japanese Patent Laid-Open No. H09 (1997)-184965 and Japanese Patent Laid-Open No. 2003-107323 have disclosed a focus detection apparatus which uses a plurality of focus detection points allowing focus detection in a plurality of directions to ensure high focus detection performance over a wide area within an image-pickup region. Especially, the focus detection apparatus disclosed in 2003-107323 includes a plurality of focus detection optical systems (that is, including a plurality of apertures, image-reforming optical systems, and photoelectrical conversion elements) to realize a number of cross focus detection points placed in the image-pickup region.

The focus detection apparatus disclosed in Japanese Patent Laid-Open No. 2003-107323, however, includes many cross focus detection points placed in the image-pickup region, so that the number of components (that is, members constituting the focus detection optical systems) is increased to cause a higher cost and a larger size of the focus detection apparatus.

On the other hand, focus detection with any type of interchangeable lens (image-pickup lens) in an image-pickup apparatus can be performed by eliminating vignetting due to the entrance pupil and the exit pupil of the image-pickup lens. However, to use a number of interchangeable lenses and dispose many cross focus detection points within the image-pickup region, luminous fluxes (optical images) after passing through the associated apertures should not overlap on a light-receiving element (photoelectrical conversion element). The prevention of overlapping of the optical images on the light-receiving element requires a longer optical path of a focus detection optical system or refraction of a luminous flux by an optical member, which leads to an increased size of the focus detection apparatus and a higher cost due to an increased number of optical members.

To place a number of cross focus detection points, a number of arrays of sensors need to be disposed on the light-receiving element, resulting in an increased size of a sensor chip and a higher cost.

BRIEF SUMMARY OF THE INVENTION

The present invention provides a focus detection apparatus which can avoid an increased size and a higher cost and achieve excellent focus detection performance to detect the focusing state of an image-pickup optical system with high accuracy, and an image-pickup apparatus including the focus detection apparatus.

The present invention in its first aspect provides a focus detection apparatus which detects the focusing state of an image-pickup lens based on the positional relationship between images provided by splitting a luminous flux from the image-pickup lens. The apparatus includes a field lens decentered from the optical axis of the image-pickup lens and a light-receiving element which includes a plurality of focus detection areas for photoelectrically converting a plurality of paired images formed of a luminous flux passed through the field lens. The light-receiving element includes at least a first focus detection area and a second focus detection area which detect a phase difference in a first direction, and a third focus detection area and a fourth focus detection area which detect a phase difference in a second direction different from the first direction. The intersection position of the first focus detection area and the third focus detection area with respect to the center of the first focus detection area is different from the intersection position of the second focus detection area and the fourth focus detection area with respect to the center of the second focus detection area.

The present invention in its second aspect provides a focus detection apparatus which detects a focusing state of an image-pickup lens based on a phase difference in a plurality of images provided by splitting a luminous flux from the image-pickup lens. The apparatus comprises a light-receiving element which includes a plurality of focus detection areas for photoelectrically converting a plurality of paired images formed of the luminous flux passed through a field lens. The light-receiving element includes a first focus detection area and a second focus detection area which detect a phase difference in a first direction, and a third focus detection area and a fourth focus detection area which detect a phase difference in a second direction different from the first direction. With respect to a line connecting the center of the first focus detection area and the center of the second focus detection area, the intersection position of the first focus detection area and the third focus detection area is located opposite to the intersection position of the second focus detection area and the fourth focus detection area.

The present invention in its third aspect provides an image-pickup apparatus which takes an object image through an image-pickup lens including the abovementioned focus detection apparatus, an image-pickup element which picks up the object image by driving the image-pickup lens to output an image signal based on a detection result of the focus detection apparatus, an A/D converter which performs analog-to-digital conversion of the image signal, and a recording controller which controls recording of a signal output from the A/D converter on a recording medium.

Other objects and features of the present invention will become readily apparent from the following description of the preferred embodiment with reference to accompanying drawings.

BRIEF DESCRIPTION OF THE DRAWINGS

FIGS. 6A and 6B are schematic plan views showing an image-reforming lens unit of the focus detection apparatus, in which FIG. 6A shows the entrance side of the image-reforming lens unit and FIG. 6B shows the emergence side thereof.

DETAILED DESCRIPTION OF THE PREFERRED EMBODIMENTS

Figure 1:
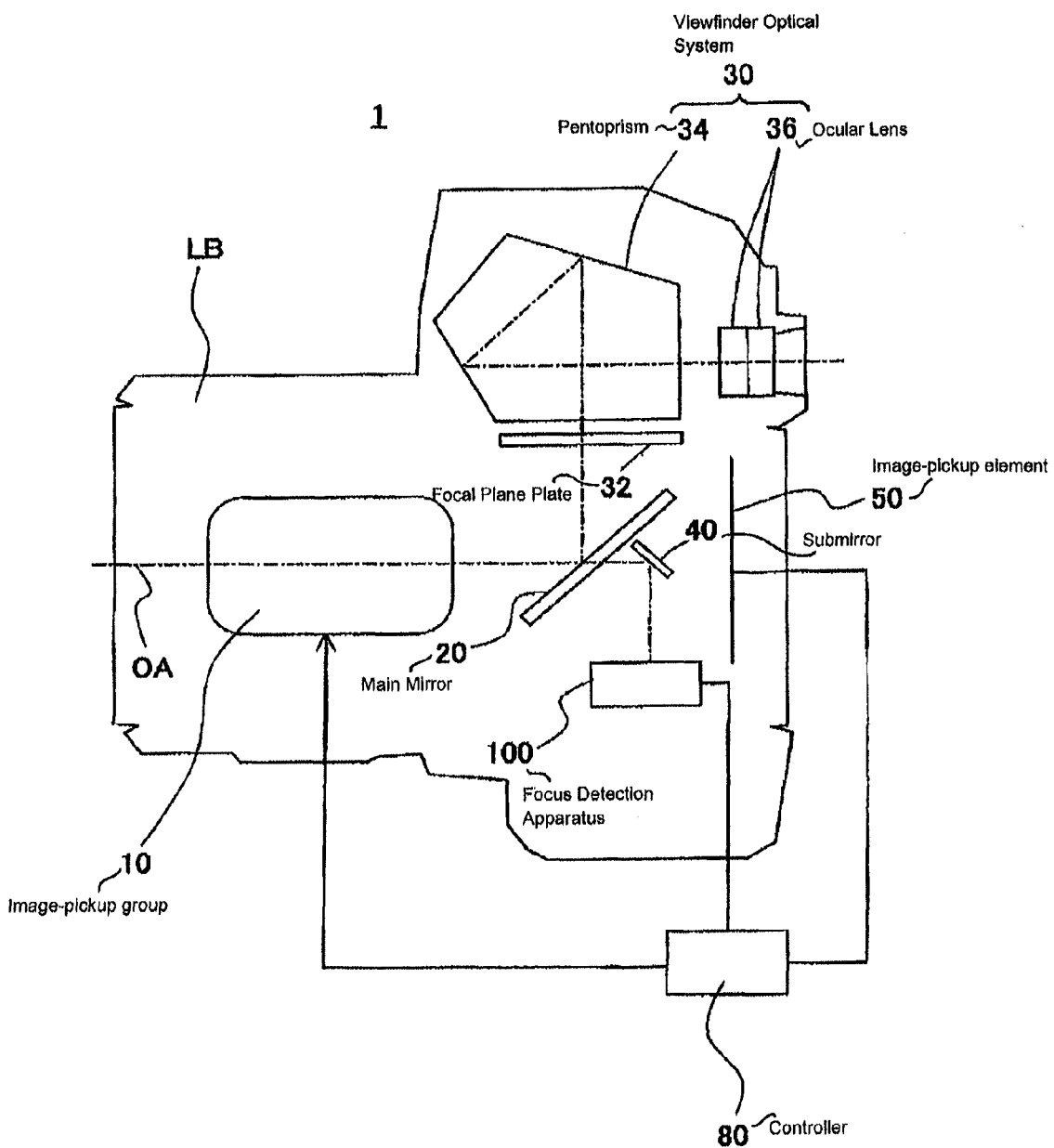
FIG. 1 is a schematic section view showing the structure of an image-pickup apparatus according to an aspect of the present invention.

An image-pickup apparatus according to an aspect of the present invention will hereinafter be described with reference to the accompanying drawings. In FIGS. 1 to 10, the same members are designated with the same reference numerals and redundant description is omitted. FIG. 1 is a schematic section view showing the structure of an image-pickup apparatus 1 which is an embodiment of the present invention.

The image-pickup apparatus 1 forms an image of light from an object on an image-pickup element through an image-pickup lens to pick up an object image. The image-pickup apparatus 1 is embodied by a single-lens reflex camera in the present embodiment.

As shown in FIG. 1, the image-pickup apparatus 1 includes an image-pickup lens 10, a main mirror 20, a viewfinder optical system 30, a sub mirror 40, an image-pickup element 50, a focus detection apparatus 100, and a controller 80. The main mirror 20, the viewfinder optical system 30, the sub mirror 40, the image-pickup element 50, the focus detection apparatus 100, and the controller 80 constitute a camera body on which the image-pickup lens 10 is removably mounted via a mount, not shown. Thus, the image-pickup lens 10 is not necessarily a component of the image-pickup apparatus 1.

The image-pickup lens 10 is an interchangeable image-pickup lens for picking up an image of an object and comprises an image-pickup optical system including a focusing lens, not shown. The focusing state of the image-pickup lens 10 is adjusted by the controller 80, later described, through the focusing lens. The image-pickup lens 10 is held by a lens barrel LB to be movable in the direction of an optical axis (OA).

The main mirror 20 is formed of a semi-transmissive half mirror or a movable mirror partially including a half mirror surface. The main mirror 20 reflects part of light transmitted through the image-pickup lens 10 and directs the reflected light toward the viewfinder optical system 30, later described, and transmits other part of the light transmitted through the image-pickup lens 10 and directs the transmitted light toward the sub mirror 40, later described.

The viewfinder optical system 30 is an optical system for allowing a user to observe an object whose image is to be picked up. In other words, the viewfinder optical system 30 provides a pseudo image of the object whose image is to be picked up for the user. As shown in FIG. 1, the viewfinder optical system 30 includes a focal plane plate 32, a pentaprism 34, and an ocular lens 36.

The focal plane plate 32 has a matt surface and a Fresnel surface, on which a viewfinder field is formed. The focal plane plate 32 diffuses light (object image) directed from the image-pickup lens 10 and reflected by the main mirror 20 and directs the light to the pentaprism 34.

The pentaprism 34 includes two reflecting surfaces at an angle of 45 degrees with respect to each other and two refracting surfaces perpendicular to light entering the pentaprism 34 and light emerging therefrom, and reflects the light diffused by the focal plane plate 32 and directs the reflected light to the ocular lens 36.

The ocular lens 36 is also called an eyepiece and has the function of forming a final image in the viewfinder optical system 30. The ocular lens 36 enlarges the image of light (object image), for example.

The sub mirror 40 is disposed posterior to the main mirror 20 and reflects the light transmitted through the main mirror 20 toward the focus detection apparatus 100. The sub mirror 40 can be moved to or retracted from an image-pickup optical path (the optical axis OA) and is disposed at a predetermined position on the image-pickup optical path when an image is observed through the viewfinder and is retracted from the image-pickup optical path when an image is picked up.

The image-pickup element 50 has regularly arranged pixels and has the function of converting an object image formed by light received from an object through the image-pickup lens 10 into an image signal (photoelectrical conversion). The image-pickup element 50 is formed of, for example, an area (two-dimensional) sensor of the type in which received light is converted into an electrical signal for each pixel and the electric charge corresponding to the received light amount is accumulated and read out. The image-pickup element 50 may also be formed of a CMOS sensor or a CCD sensor. An output signal from the image-pickup element 50 is subjected to predetermined processing in an image processing circuit, not shown, to generate image data which is then recorded on a recording medium such as a semiconductor memory, an optical disk, and a magnetic tape, not shown.

The focus detection apparatus 100 detects the focusing state of the image-pickup lens 10 with the phase difference detection method. Specifically, the focus detection apparatus 100 splits the light directed from the image-pickup lens 10 and reflected by the sub mirror 40 into at least a pair of images and detects the focusing state of the image-pickup lens 10 based on a signal provided by photoelectrically converting the pair of images.

Figure 2:
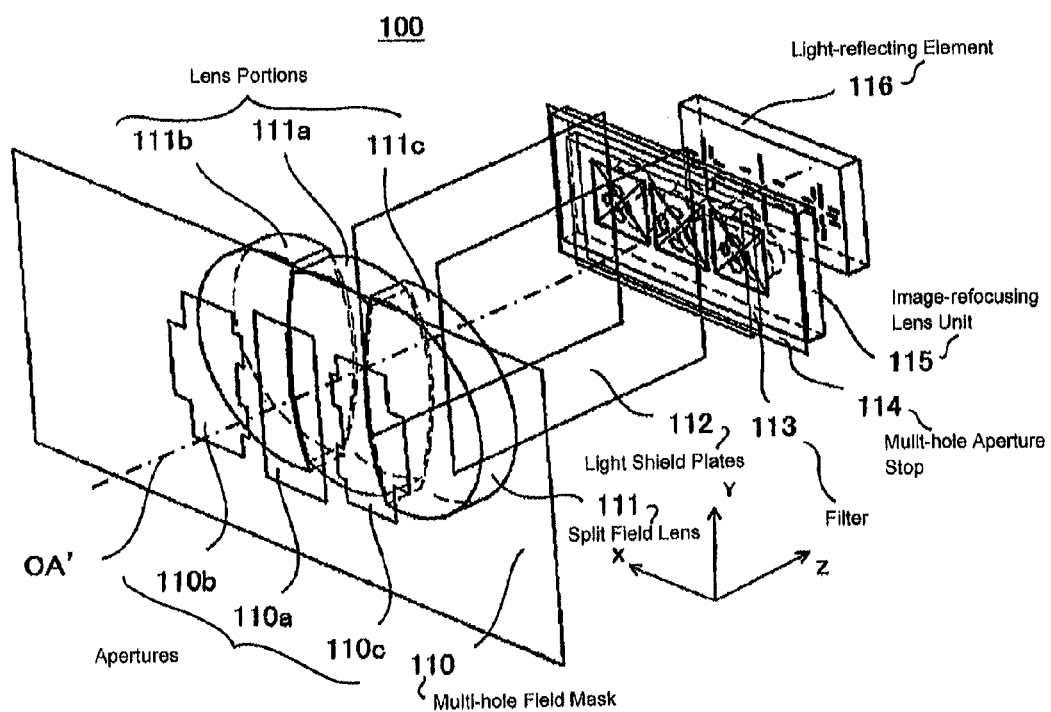
FIG. 2 is a schematic perspective view showing the structure of a focus detection apparatus shown in FIG. 1.
Figure 3:
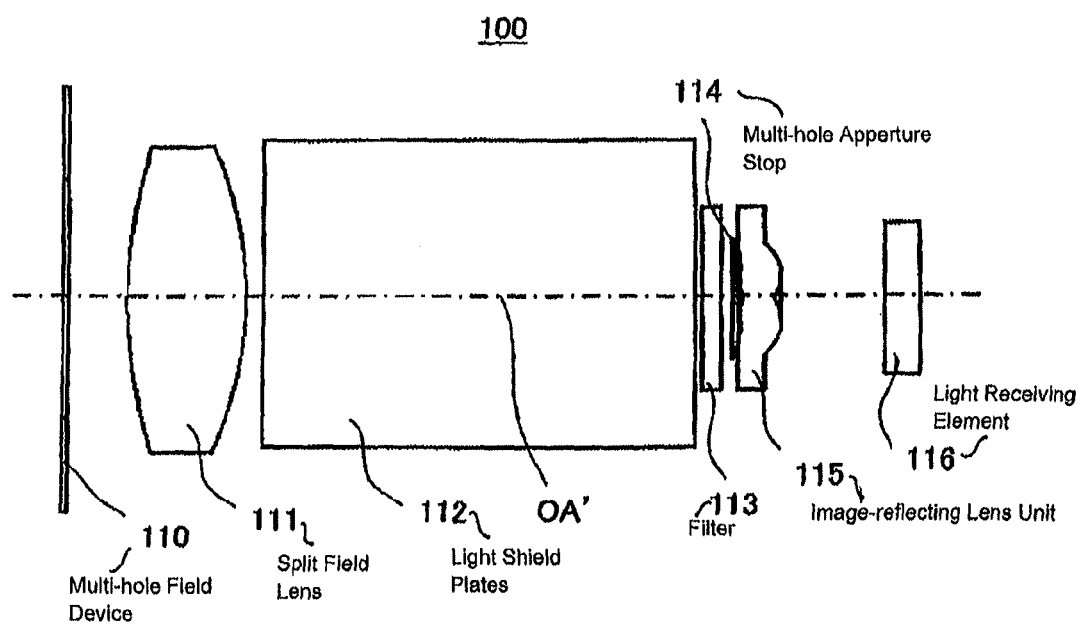
FIG. 3 is a section view of the focus detection apparatus shown in FIG. 2 taken along a YZ plane.
Figure 4:
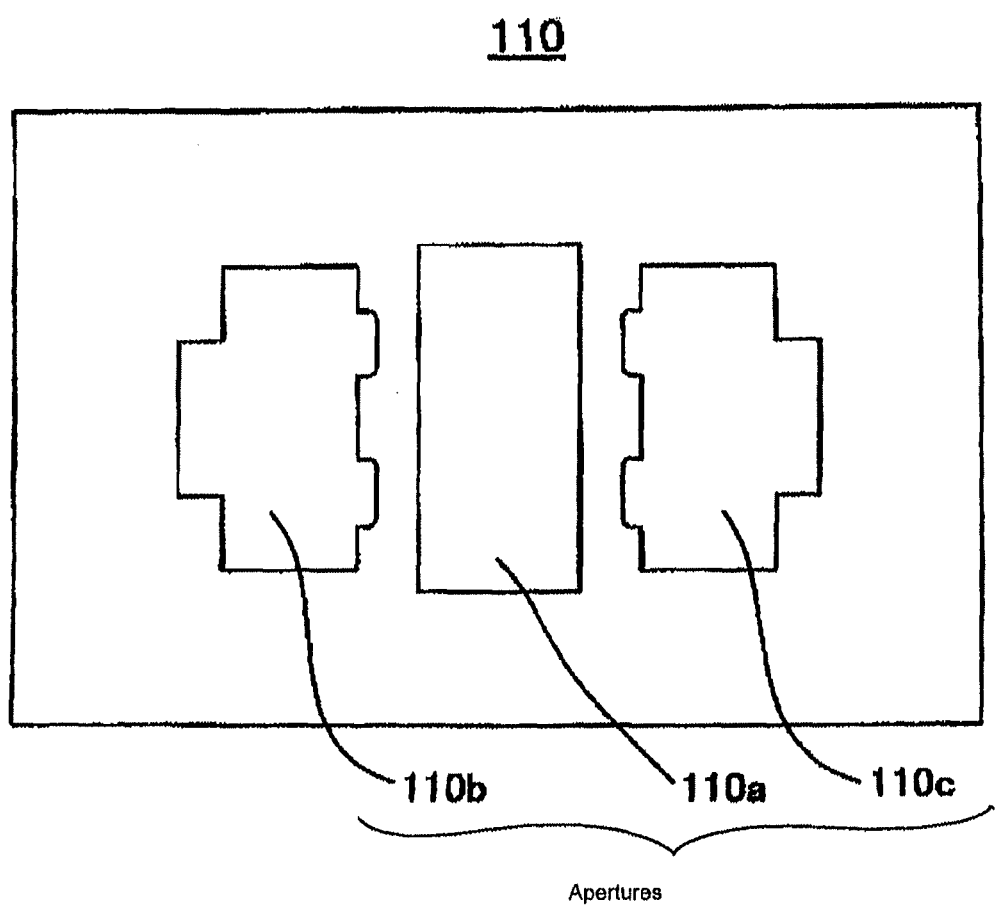
FIG. 4 is a schematic plan view showing a multi-hole field mask of the focus detection apparatus shown in FIGS. 2 and 3.
Figure 5:
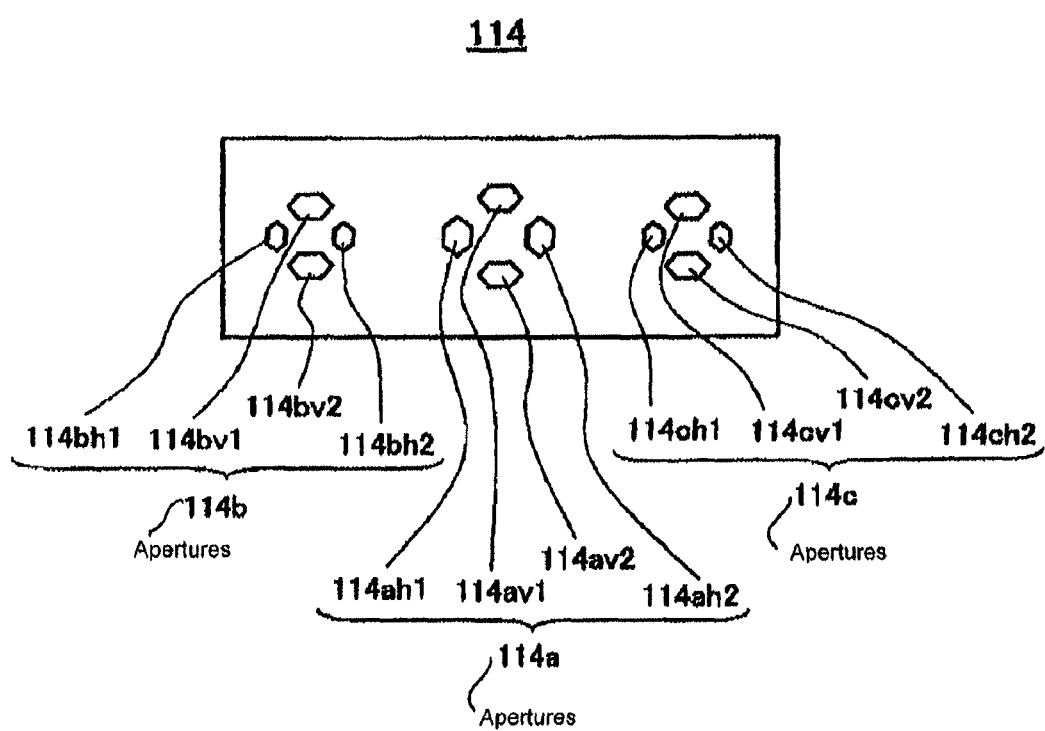
FIG. 5 is a schematic plan view showing a multi-hole aperture stop of the focus detection apparatus shown in FIGS. 2 and 3.
Figure 6A:
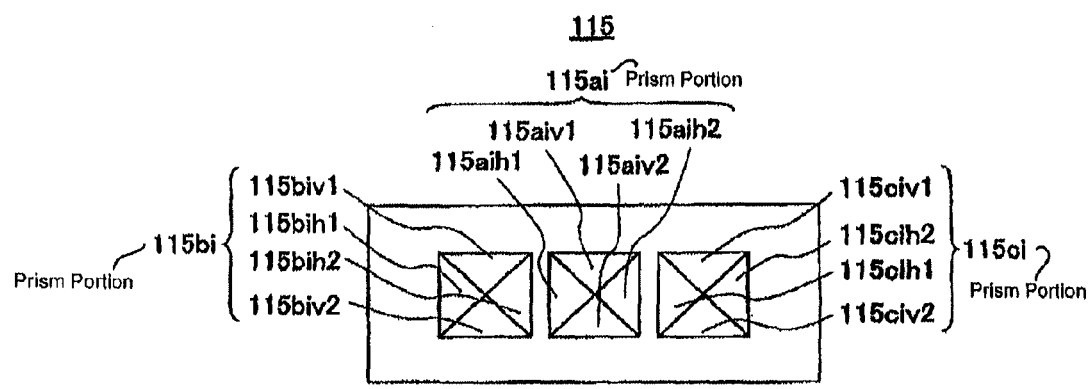
Figure 6B:
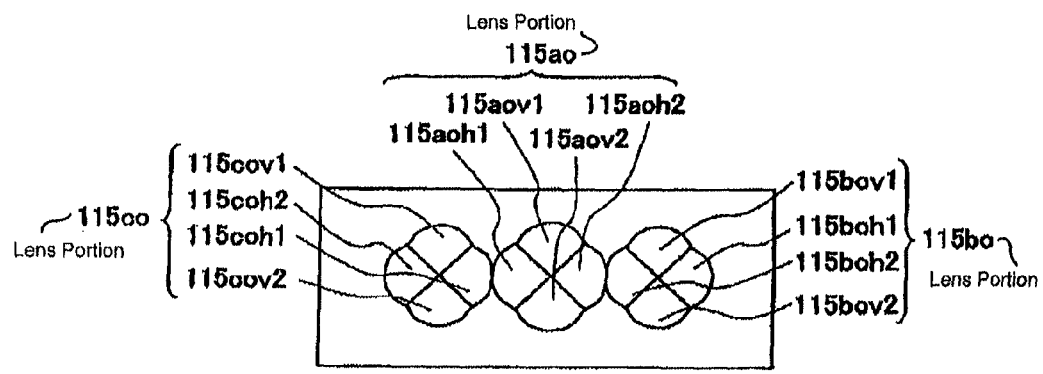

The focus detection apparatus 100 will be described in more detail with reference to FIGS. 2 to 10. FIG. 2 is a schematic perspective view showing the structure of the focus detection apparatus 100. FIG. 3 is a section view of the focus detection apparatus 100 taken along a YZ plane. FIG. 4 is a schematic plan view showing a multi-hole field mask of the focus detection apparatus 100. FIG. 5 is a schematic plan view showing a multi-hole aperture stop of the focus detection apparatus 100. FIGS. 6A and 6B are schematic plan views showing an image-reforming lens unit of the focus detection apparatus 100, in which FIG. 6A shows the entrance side of the image-reforming lens unit and FIG. 6B shows the emergence side thereof. In FIGS. 2 and 3, an optical axis OA' corresponds to the optical axis OA deflected by the sub mirror 40.

Reference numeral 110 shows the multi-hole field mask. As shown in FIG. 4, the multi-hole field mask 110 has a rectangular aperture 110a at the center, and apertures 110b and 110c placed adjacent to the aperture 110a. The multi-hole field mask 110 is placed close to a predetermined image-forming plane of the image-pickup lens 10.

Reference numeral 111 shows a split filed lens. The split field lens 111 is placed posterior to the multi-hole field mask 110. The split field lens 111 is formed of a plurality of lens portions 111a, 111b, and 111c with different optical effects. The lens portions 111a, 111b, and 111c have different lens optical axes. In the present embodiment, the lens portions 111b and 111c have the optical axes decentered from the optical axis OA' of the image-pickup lens 10. The lens portions 111a, 111b, and 111c are associated with the apertures 110a, 110b, and 110c of the multi-hole field mask 110, respectively.

Reference numeral 112 shows light-shield plates. The light-shield plates 112 are placed posterior to the split field lens 111. The light-shield plates 112 split the optical path after the split field lens 111 into three for the respective lens portions of the split field lens 111 to separate the luminous fluxes associated therewith.

Reference numeral 113 shows a filter. The filter 113 shields light having a wavelength longer than that of near-infrared rays. The filter 113 is adapted to detect the focusing state of the image-pickup lens 10 with corrected aberration for visible light and prevents unnecessary infrared rays from entering a light-receiving element 116, later described.

Reference numeral 114 shows the multi-hole aperture stop. The multi-hole aperture stop 114 is formed of a thin plate and is placed next to the filter 113. As shown in FIG. 5, the multi-hole aperture stop 114 has two pairs of apertures 114av1 and 114av2 and apertures 114ah1 and 114ah2 at the center. The multi-hole aperture stop 114 also has two pairs of apertures 114bv1 and 114bv2 and apertures 114bh1 and 114bh2 on the left from the center. The multi-hole aperture stop 114 also has two pairs of apertures 114cv1 and 114cv2 and apertures 114ch1 and 114ch2 on the right from the center. The aperture 114a includes the apertures 114av1 and 114av2 and the apertures 114ah1 and 114ah2. The aperture 114b includes the apertures 114vb1 and 114vb2 and the apertures 114bh1 and 114bh2. The aperture 114c includes the apertures 114cv1 and 114cv2 and the apertures 114ch1 and 114ch2.

Reference numeral 115 shows the image-reforming lens unit (secondary optical system). The image-reforming lens unit 115 re-forms an object image (secondary image), after the image forming on the predetermined image-forming plane by the image-pickup lens 10, on a plurality of pairs of photoelectrical conversion elements (sensors) of the light-receiving element 116 placed posterior to the image-reforming lens unit 115. The image-reforming lens unit 115 has prism portions and lens portions associated with the six pairs of the apertures in the multi-hole aperture stop 114.

As shown in FIG. 6A, the image-reforming lens unit 115 has prism portions associated with the apertures of the multi-hole aperture stop 114 on the entrance side. The image-reforming lens unit 115 has two pairs of prism portions 115aiv1 and 115aiv2 and prism portions 115aih1 and 115aih2 at the center. The image-reforming lens unit 115 also has two pairs of prism portions 115biv2 and 115biv2 and prism portions 115bih1 and 115bih2 on the left from the center. The image-reforming lens unit 115 also has two pairs of prism portions 115civ1 and 115civ2 and prism portions 115cih1 and 115cih2 on the right from the center. The prism portion 115ai includes the prism portions 115aiv1 and 115aiv2 and the prism portions 115aih1 and 115aih2. The prism portion 115bi includes the prism portions 115biv1 and 115biv2 and the prism portions 115bih1 and 115bih2. The prism portion 115ci includes the prisms portions 115civ1 and 115civ2 and the prism portions 115cih1 and 115cih2.

As shown in FIG. 6B, the image-reforming lens unit 115 has lens portions associated with the prism portions on the emergence side. The lens portion has a spherical surface. The image-reforming lens unit 115 has two pairs of lens portions 115aov1 and 115aov2 and lens portions 115aoh1 and 115aoh2 at the center. The image-reforming lens unit 115 also has two pairs of lens portions 115cov2 and 115cov2 and lens portions 115coh1 and 115coh2 on the left from the center. The image-reforming lens unit 115 also has two pairs of lens portions 115bov1 and 115bov2 and lens portions 115boh1 and 115boh2 on the right from the center. Since FIG. 6A shows the image-reforming lens unit 115 viewed from the entrance side and thus FIG. 6B shows the image-reforming lens unit 115 viewed from the emergence side, the abovementioned lens portions are reversed left to right in FIG. 6B. The lens portion 115ao includes the lens portions 115aov1 and 115aov2 and the lens portions 115aoh1 and 115aoh2. The lens potion 115bo includes the lens portions 115bov1 and 115bov2 and the lens portions 115boh1 and 115boh2. The lens portion 115co includes the lens portions 115cov1 and 115cov2 and the lens portions 115coh1 and 115coh2.

Next, the focus detection operation of the focus detection apparatus 100 will be described. In the drawings, subscripts a, b, and c of the reference numerals represent the associated optical paths. Subscripts 1, 2, and 3 of the reference numerals represent components for forming two object images which form a pair in the focus detection apparatus in the phase difference detection method. The optical paths are separated by the light-shield plates 112 as described above.

Luminous fluxes pass through the apertures 110a to 110c of the multi-hole field mask 110 and the lens portions 111a to 111c of the split field lens 111, respectively, and enter the multi-hole aperture stop 114 via the filter 113. The apertures 114a to 114c of the multi-hole aperture stop 114 are back-projected to near the exit pupil of the image-pickup lens 10 by the lens portions 111a to 111c of the split filed lens 111, respectively. Thus, part of the luminous flux entering the apertures 110a to 110c of the multi-hole field mask 110 inevitably reaches the apertures 114a to 114c of the multi-hole aperture stop 114.

The luminous flux passing through each aperture of the multi-hole field mask 110 is then directed to each prism portion and lens portion of the image-reforming lens unit 115 placed posterior to the multi-hole aperture stop 114. The aperture 110b of the multi-hole field mask 110 is provided for a set of focus detection optical systems including the lens portion 111b of the split field lens 111, the aperture 114b of the multi-hole aperture stop 114, the prism portion 115bi and the lens portion 115bo of the image-reforming lens unit 115. This applies to the aperture 110c arranged symmetrically with respect to the optical axis OA'.

The luminous flux emerges from the image-reforming lens unit 115 and enters the light-receiving element 116 located posterior thereto. Six pairs of secondary images (twelve in total) are formed on the light-receiving element 116 from the object images (optical images) at the three apertures 110a to 110c of the multi-hole field mask 110.

Figure 7:
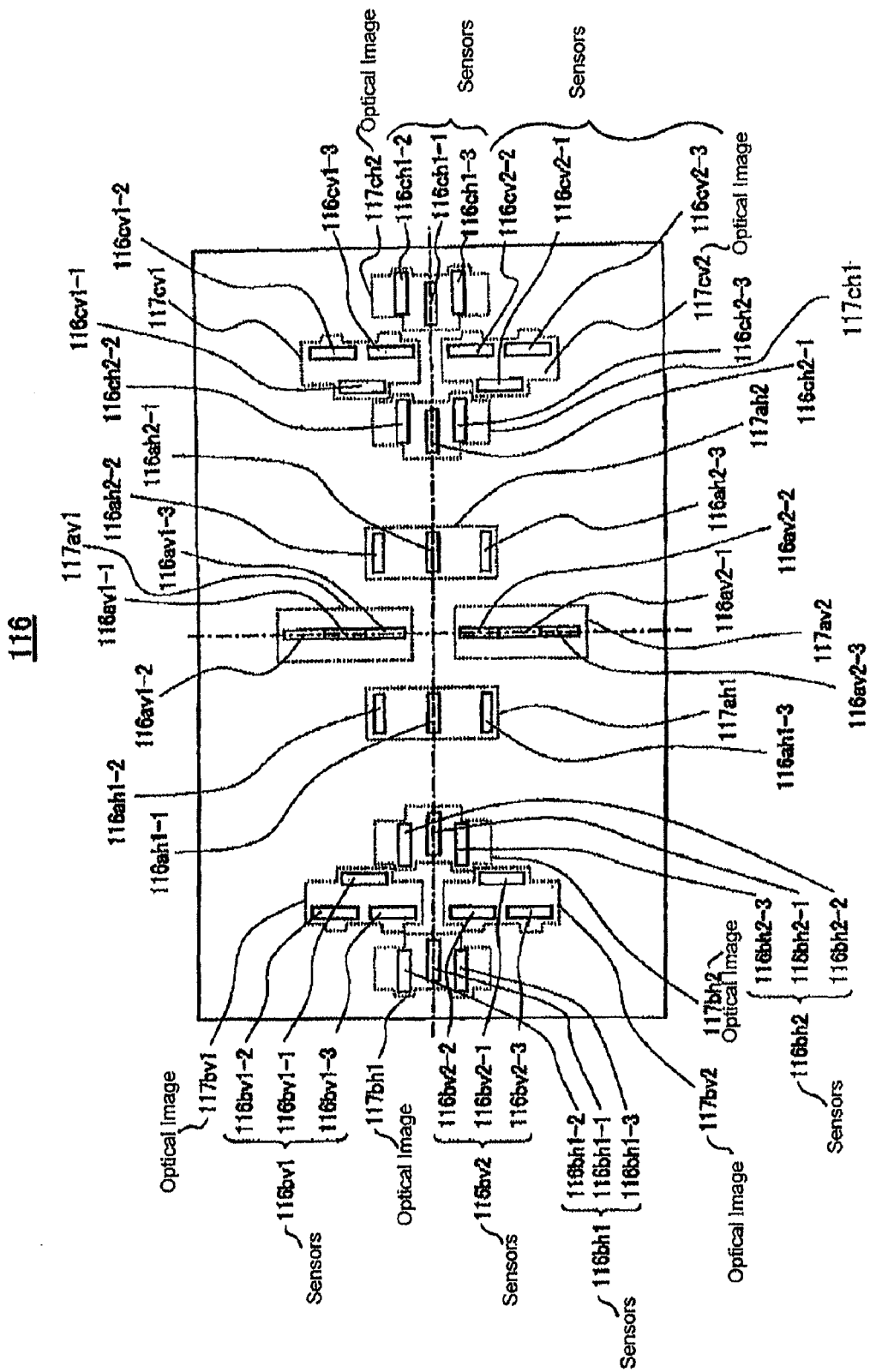
FIG. 7 is a schematic plan view showing a light-receiving element of the focus detection apparatus shown in FIGS. 2 and 3.

FIG. 7 is a schematic plan view showing the light-receiving element 116 on which the object images are formed. In FIG. 7, reference numerals 117av1 to 117ch2 show the optical images formed through the apertures 110a to 110c of the multi-hole field mask 110 when the image-pickup lens 10 is in an in-focus state. The effects of the paired apertures (the subscripts 1 and 2 in FIG. 5) of the multi-hole aperture stop 114 and the paired prism portions and lens portions (the subscripts 1 and 2 in FIGS. 6A and 6B) of the image-reforming lens unit 115 form two pairs of optical images for one aperture of the multi-hole field mask 110.

Reference numerals 116av1-1 to 116ch2-3 show arrays of sensors (arrays of photoelectrical conversion elements) each of which is formed of plural pixels. The arrays of sensors 116av1-1 to 116ch2-3 are arranged within the optical images 117av1 to 117ch2. For example, the optical image through the aperture 110b of the multi-hole field mask 110 corresponds to two pairs of optical images 117bv1 and 117bv2 and optical images 117bh1 and 117bh2. Arranged within the optical images 117bv1 and 117bv2 are three pairs of arrays of sensors 116bv1-1, 116bv1-2, 116bv1-3 and 116bv2-1, 116bv2-2, and 116bv2-3 having focus detection areas in a vertical direction on the object. Arranged within optical images 117bh1 and 117bh2 are three pairs of arrays of sensors 116bh1-1, 116bh1-2, 116bh1-3 and 116bh2-1, 116bh2-2, and 116bh2-3 having focus detection areas in a horizontal direction on the object. This enables formation of a substantially cross-shaped focus detection area on the predetermined image-forming plane of the image-pickup lens 10. As a result, focus detection operation is not dependent on the spatial pattern of the object. A substantially cross-shaped focus detection area is also formed on the predetermined image-forming plane of the image-pickup lens 10 for the apertures 110a and 110c of the multi-hole field mask 110. The arrays of sensors 116bv1 include the arrays of sensors 116bv1-1, 116bv1-2, and 116bv1-3, and the arrays of sensors 116bv2 include the arrays of sensors 116bv2-1, 116bv2-2, and 116bv2-3. The arrays of sensors 116bh1 include the arrays of sensors 116bh1-1, 116bh1-2, and 116bh1-3, and the arrays of sensors 116bh2 include the arrays of sensors 116bh2-1, 116bh2-2, and 116bh2-3.

The arrays of sensors 116av1-1 to 116ch2-3 are formed of arrays of photoelectrical conversion elements of an accumulation type. In the present embodiment, as shown in FIG. 7, the paired sensor arrays are formed in a substantially linear shape, but they may have a shape adjusted to distortion of an optical image to cancel out distortion aberration of the focus detection optical system. In addition, the paired sensor arrays are not necessarily placed separately, and an array of sensors disposed in a single row can be used and split into a plurality of portions in the process of signal processing.

In the focus detection apparatus 100, the optical images of an object formed through the multi-hole field mask 110 are moved on the light-receiving element 116 in a direction in which they approach each other or they are moved away from each other in connection with the actual position of an object image in the optical axis direction relative to the predetermined image-forming plane. For example, when the image-pickup lens 10 forms an image of a luminous flux before the predetermined image-forming plane, the paired optical images on the sensor arrays of the light-receiving element 116 are moved in a direction in which they approach. When the image-pickup lens 10 forms an image of a luminous flux after the predetermined image-forming surface, the paired optical images on the sensor arrays of the light-receiving element 116 are moved in the opposite direction, that is, the direction in which they are moved away from each other. The sensor arrays are arranged in the direction in which the optical images are moved, thereby detecting the movements of the optical images. Based on the detection result (output from the light-receiving element 116), the relative distance in the light amount distribution of the optical images is calculated by a well-known correlation calculating means.

When the amount of the change of the distance between the paired optical images can be determined, the relationship between the change amount and the defocus amount of the image-pickup lens 10 can be approximated by a polynomial or the like with the change amount used as a variable to determine the defocus amount of the image-pickup lens 10. This enables detection of focus (focusing state) of the image-pickup lens 10. In other words, calculating the distance between the optical images enables to detect the focus (focusing state) of the image-pickup lens 10 at plural focus detection areas provided as the back-projected images from the sensor arrays onto the predetermined image-forming plane.

The paired sensor arrays 116bv1 and 116bv2 include sensors (pixels) arranged in the vertical direction, so that they are suitable for focus detection of an object having a contrast component in the vertical direction. On the other hand, since the sensor arrays 116bh1 and 116bh2 include sensors (pixels) arranged in the horizontal direction, they are suitable for focus detection of an object having a contrast component in the horizontal direction. Both of them can be combined to realize focus detection of a so-called cross type which is not affected by the contrast component of the object. In the present embodiment, only the aperture 110b (with the subscript b) of the multi-hole field mask 110 has been described, but the similar description applies to the apertures 110a (with the subscript a) and 110c (with the subscript c).

Figure 8A:
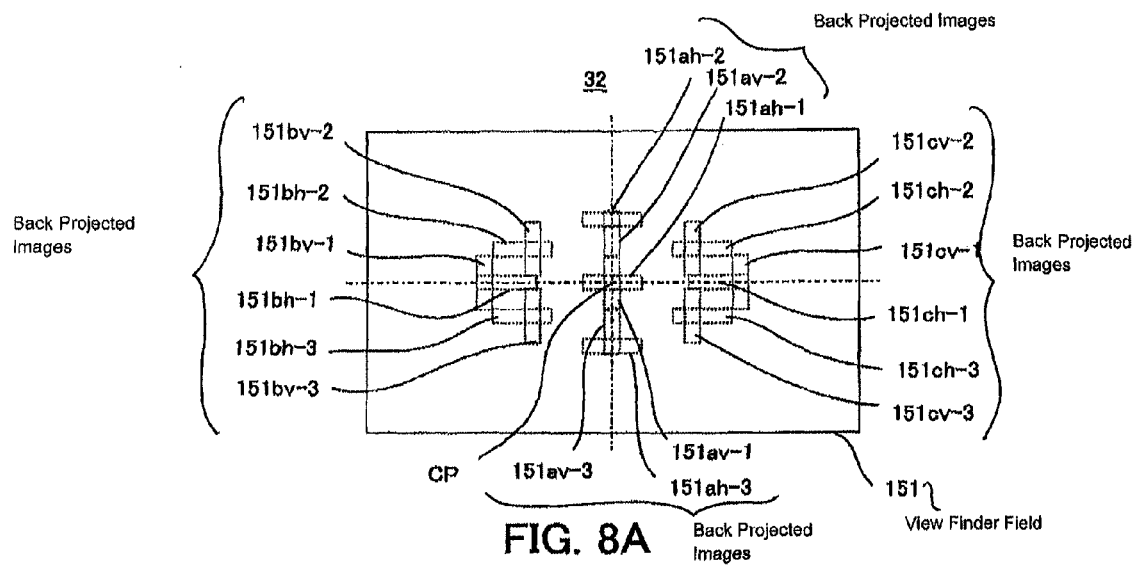
FIGS. 8A and 8B are schematic diagrams for explaining focus detection areas on a viewfinder field.

Next, focus detection areas in the viewfinder field will be described with reference to FIGS. 8A and 8B. FIG. 8A shows the surface of the focal plane plate 32 of the image-pickup apparatus 1 observed through the pentaprism 34 and the ocular lens 36 to explain the relationship between the viewfinder field and the focus detection areas. Since the focal plane plate 32 is placed close to the predetermined image-forming plane of the image-pickup lens 10, the focal plane plate 32 in FIG. 8 can be considered as the predetermined image-forming plane. CP shows the intersection point of the optical axis OA' of the image-pickup lens 10 and the focal plane plate 32 (predetermined image-forming plane) and represents the center of the viewfinder (center of the predetermined image-forming plane).

Figure 8B:
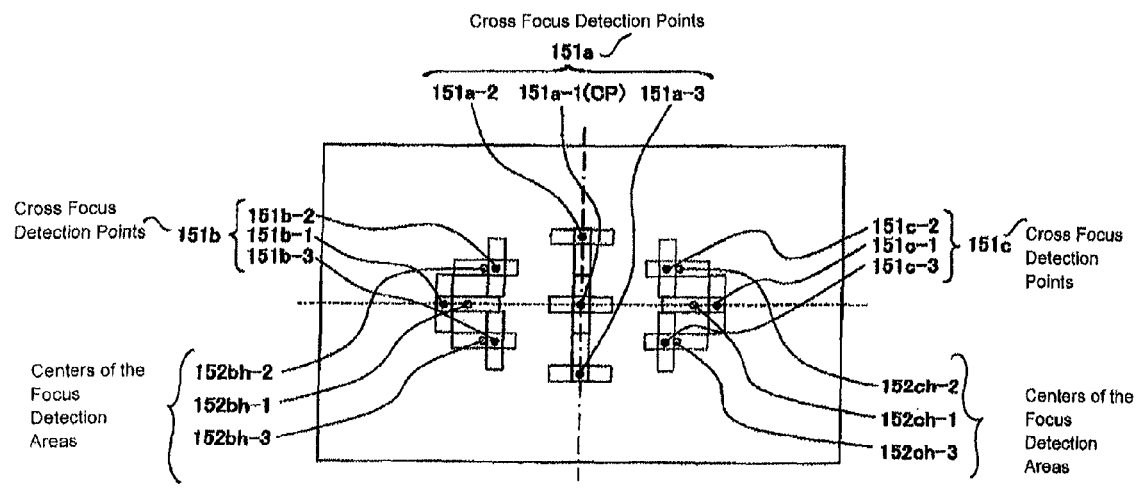

In FIGS. 8A and 8B, reference numeral 151 shows the viewfinder field which is provided as an erect image in an image-pickup region. When the paired sensor arrays in the light-receiving element 116 are back-projected onto the predetermined image-forming plane of the image-pickup lens 10, they overlap and substantially match. In the viewfinder field 151, reference numerals 151av-1 to 151ch-3 show back-projected images associated with the paired sensor arrays in the light-receiving element 116. Since the back-projected images 151av-1 to 151ch-3 are provided by the sensor arrays in the light-receiving element 116, they can detect the light amount distribution of an object in substantially cross-shaped areas. In other words, the back-projected images 151av-1 to 151ch-3 serve as so-called cross-type focus detection areas. In the present embodiment, three cross-type focus detection areas exist at the center of the viewfinder field 151 and outside the axis on the left and right (nine in total) to allow focus detection of the object included in each of the focus detection areas. The subscripts av to ch provided for the focus detection areas correspond to the subscripts of the sensor arrays in the light-receiving element 116 shown in FIG. 7. For example, back-projecting the sensor arrays 116av1-1 and 116av2-1 forms a back-projected image 151av-1 as the focus detection area.

The back-projected images 151av-1 to 151ch-3 have their longitudinal directions used as phase difference detection directions and are associated with the focus detection areas described in FIG. 7. For example, 151bv-2 is associated with the phase difference detection direction of 116bv1-2 and 116bv2-2 and has a stretch in another direction. 151bh-2 is associated with the phase difference detection direction of 116bh1-2 and 116bh2-2 and has a stretch in another direction. In addition, 151bv-1 is associated with the phase difference detection direction of 116bv1-1 and 116bv2-1 and has a stretch in another direction. 151bh-1 is associated with the phase difference detection direction of 116bh1-1 and 116bh2-1 and has a stretch in another direction.

The intersection of the horizontal area (subscript h) and the vertical area (subscript v) of the cross-type focus detection area in the viewfinder field 151 is defined as a cross focus detection point. As shown in FIG. 8B, each cross focus detection point is expressed as 151a-1 to 151c-3 without using the subscript v or h. In the present embodiment, the luminous fluxes pass through the lens portions 111a to 111c of the split field lens 111 and form the cross focus detection points 151a to 151c, respectively. The cross focus detection point 151a includes three cross focus detection points 151a-1, 151a-2, and 151a-3. The cross focus detection point 151b includes three cross focus detection points 151b-1, 151b-2, and 151b-3. The cross focus detection point 151c includes three cross focus detection points 151c-1, 151c-2, and 151c-3. Reference numerals 152bh-1 to 152bh-3 show the centers of the focus detection areas as the centers of the stretches of the back-projected images (focus detection areas) 151bh-1 to 151bh-3. Similarly, reference numerals 152ch-1 to 152ch-3 show the centers of the stretches of the back-projected images (focus detection areas) 151ch-1 to 151ch-3.

A preferable focus detection optical system has a plurality of focus detection areas covering a wide range at positions where an object is likely to be located in view of composition in picking up images. From the viewpoint of incorporation into the image-pickup apparatus, a focus detection optical system preferably has a small overall length and a small size. In addition, in terms of manufacture cost, a preferable focus detection optical system includes a light-receiving element having a small size since the light-receiving element accounts for a large proportion of the cost.

To realize the focus detection optical system which satisfies the requirements, the aperture of the multi-hole field mask 110 shown in FIG. 2 is desirably located as far as possible from the intersection with the optical axis OA'. The luminous flux after passing through the multi-hole field mask 110 is refracted by the split field lens 111 and is directed to the multi-hole aperture stop 114 and the image-reforming lens unit 115, each of which is integrally formed, regardless of the aperture of the multi-hole field mask 110 through which the luminous flux passes. In addition, the luminous flux emerging from the image-reforming lens unit 115 is desirably converged toward the light-receiving element 116.

In the image-pickup region (viewfinder field 151), however, as the number of the focus detection areas in which the cross focus detection can be performed is increased, the optical images 117av1 to 117ch2 overlap on the light-receiving element 116 to prevent proper focus detection. This can be avoided by concentrating the focus detection areas at the center of the image-pickup region or by increasing the overall length of the focus detection optical system, but the above-mentioned preferable focus detection optical system is not realized. In the present embodiment, the plurality of focus detection areas are appropriately placed to avoid the increased size of the focus detection optical system and to realize the plurality of focus detection areas over a wide area within the image-pickup region.

Description will be made of the placement of the focus detection areas in the horizontal direction for the lens portions 111b and 111c of the split field lens 111 decentered from the optical axis OA' of the image-pickup lens 10.

For the distance from the viewfinder center (center of the predetermined image-forming plane) CP to the position of each cross focus detection point in the horizontal direction, the cross focus detection points 151b-2 and 151b-3 have short distances, and the cross focus detection point 151b-1 has a long distance. In the present embodiment, the horizontal focus detection area (back-projected area) 151bh-2 is located such that the stretch center 152bh-2 of the horizontal focus detection area 151bh-2 including the cross focus detection point 151b-2 with the short distance is located farther from the viewfinder center CP than the cross focus detection point 151b-2 in the horizontal direction. For the cross focus detection point 151b-3 with the short distance, the focus detection area thereof is located in the same manner as for the cross focus detection point 151b-2.

The optical function of the split field lens 111 (split by the lens portions 111a to 111c) contributes greatly to a reduced size of the focus detection apparatus 100. On the other hand, to prevent stray light between the optical paths split by the split field lens 111, a light shield is needed in the border between the split lens portions (the border between the lens portions 111a and 111b and the border between the lens portions 111a and 111c in the present embodiment).

The case where high priority is given to the placement of the cross focus detection points in view of the composition in picking up images is considered. For example, if the center of the horizontal focus detection area for the cross focus detection point close to the split position of the split field lens 111 is matched with the position of the cross focus detection point, the light shield cannot be formed physically between the aperture 110a and the aperture 110b of the multi-hole field mask 110.

In the present embodiment, for the cross focus detection point with the short distance from the viewfinder center CP, the center of the horizontal focus detection area is placed as described above. This can realize the cross focus detection while high priority is put on the placement of the cross focus detection points in view of the composition in picking up images. Since no new optical member is required therefor, an increased size and a higher cost of the focus detection apparatus 100 can be prevented.

Next, description will be made of the placement of the horizontal focus detection area (back-projected image) 151bh-1 including the cross focus detection point 151b-1 with the long distance from the viewfinder center CP in the horizontal direction. In the present embodiment, the horizontal focus detection area 151bh-1 is disposed such that the stretch center 151bh-1 of the horizontal focus detection area 151bh-1 including the cross focus detection point 151b-1 is located closer to the viewfinder center CP than the cross focus detection point 151b-1 in the horizontal direction.

The focus detection apparatus 100 of the present embodiment detects the focusing state by using the luminous flux passing through the image-pickup lens 10. Thus, vignetting occurs due to the pupils of the image-pickup lens 10 in association with the distances and shapes of the focus detection areas and the paired apertures of the multi-hole aperture stop 114 (for example, the apertures 114av1 and 114av2).

Figure 9:
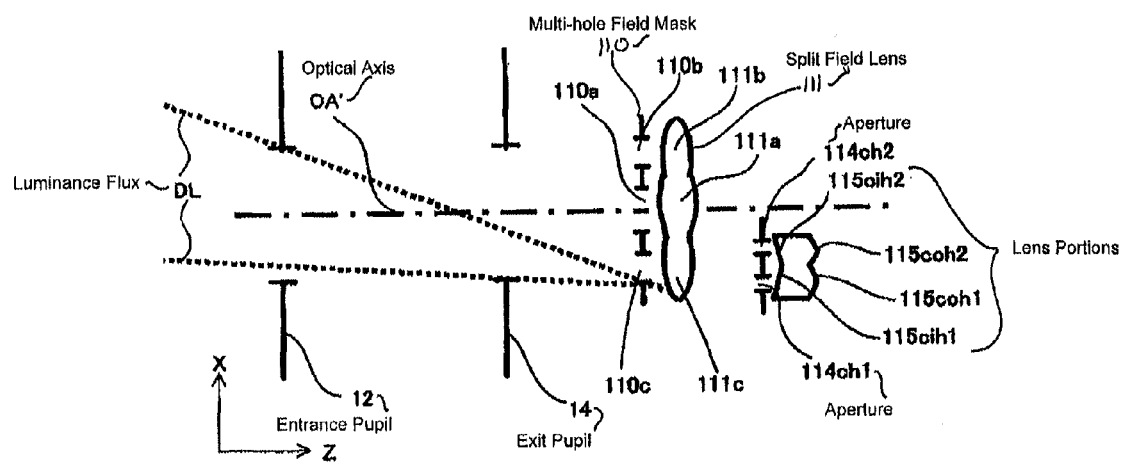
FIG. 9 is a section view of the focus detection apparatus shown in FIG. 2 taken along an XZ plane.

The vignetting due to the pupils of the image-pickup lens 10 will be described with reference to FIGS. 9 and 10. FIG. 9 schematically shows the focus detection apparatus 100 shown in FIG. 2 taken along an XZ plane. In the focus detection apparatus 100 of the present embodiment, the split field lens 111 splits the optical path into three. However, only the luminous flux transmitted through the lens portion 111c of the split field lens 111 will be noted and described herein, so that only portions of the multi-hole aperture stop 114 and the image-reforming lens unit 115 are shown.

In FIG. 9, reference numerals 12 and 14 show the entrance pupil and exit pupil of the image-pickup lens 10, respectively. Dotted lines DL show a luminous flux. Specifically, the luminous flux represented by the two dotted lines DL reaches the position farthest from the optical axis OA' of the image-pickup lens 10 in the aperture 110c of the multi-hole field mask 110.

Figure 10:
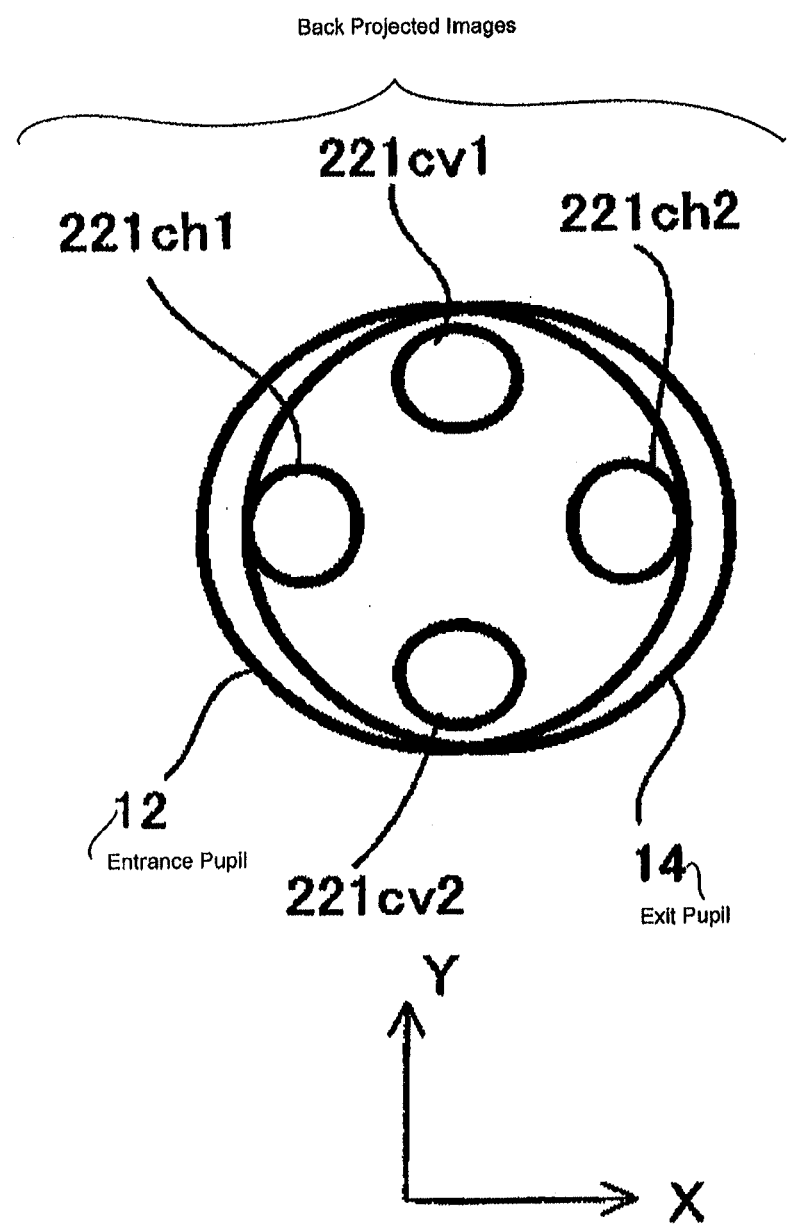
FIG. 10 is a plan view schematically showing an entrance pupil and the exit pupil of an image-pickup lens viewed from the aperture of the multi-hole field mask of the focus detection apparatus shown in FIG. 2.

FIG. 10 is a plan view schematically showing the entrance pupil 12 and the exit pupil 14 of the image-pickup lens 10 viewed from the aperture 110c of the multi-hole field mask 110. The luminous flux represented by the two dotted lines DL shown in FIG. 9 is a luminous flux passing through substantially circular overlapping portions of the entrance pupil 12 and the exit pupil 14 in FIG. 10. As described above, the aperture of the multi-hole aperture stop 114 is back-projected to near the exit pupil 14 of the image-pickup lens 10 by the split field lens 111 with no vignetting due to the entrance pupil 12 and the exit pupil 14.

In FIG. 10, reference numerals 221cv1, 221cv2, 221ch1, and 221ch2 show back-projected images of the apertures 114cv1, 114cv2, 114ch1, and 114ch2 of the multi-hole aperture stop 114. The multi-hole aperture stop 114 can be formed such that the back-projected images are projected on the overlapping portions of the entrance pupil 12 and the exit pupil 14 in FIG. 10 to prevent the occurrence of vignetting.

As apparent from FIGS. 9 and 10, the size of the overlapping portion of the entrance pupil 12 and the exit pupil 14 is reduced in a focus detection area with a larger distance from the optical axis OA' of the image-pickup lens 10. When the overlapping portion is small, the back-projected image including the focus detection area in the decentering direction of the lens portion 111c of the split field lens 111 from the optical axis OA' of the image-pickup lens 10 is more likely to involve vignetting than the back-projected image including the focus detection area in the direction orthogonal to the decentering direction. In the present embodiment, the back-projected images 221ch1 and 221ch2 in the horizontal direction include the focus detection areas in the decentering direction of the lens portion 111c of the split field lens 111. The back-projected images 221cv1 and 221cv2 in the vertical direction include the focus detection areas in the direction orthogonal to the decentering direction of the lens portion 111c of the split field lens 111.

In this manner, as the distance is longer from the cross focus detection point to the viewfinder center CP, vignetting due to the pupils of the image-pickup lens 10 has more significant effects, and particularly, causes reduced reliability of the focus detection result in the horizontal focus detection area (back-projected image) 151bh-1. If the center of the horizontal focus detection area including the cross focus detection point with the long distance from the viewfinder center CP in the horizontal direction is matched with the position of the cross focus detection point while the length of the horizontal focus detection area is maintained, vignetting due to the pupils of the image-pickup lens 10 is significantly seen as compared with the vertical focus detection area.

To address this, it is contemplated that vignetting due to the pupils of the image-pickup lens 10 is prevented by reducing the distance between the apertures of the multi-hole aperture stop 114 or reducing the area of the apertures. Such solutions, however, are not preferable since they reduce the focus detection performance and accuracy as well as lead to a reduced lower limit of luminance in focus detection of the phase difference detection method.

The focus detection apparatus 100 of the present embodiment can realize the cross focus detection without reducing the performance, accuracy, and lower limit of luminance in focus detection. This can be achieved by locating the center of the horizontal focus detection area including the cross focus detection point with the long distance from the viewfinder center in the horizontal direction as described above. While only the left portion of FIGS. 8A and 8B (with the subscripts b) has been described in the present embodiment because of the symmetric structure, the abovementioned description also applies to the right portion of FIGS. 8A and 8B (with the subscripts c).

The focus detection apparatus 100 has the cross focus detection point with the short distance from the center of the image-pickup plane (the optical axis OA') in the horizontal direction and the cross focus detection point with the long distance from the center of the image-pickup plane in the horizontal direction, which are arranged alternately in the vertical direction (focus detection areas (back-projected images) 151bh-1, 151bh-2, and 151bh-3). Since the focus detection areas are the back-projected images of the sensor arrays on the light-receiving element 116, the arrangement reduces the distance between the sensor arrays on the light-receiving element 116. Consequently, the sensor arrays on the light-receiving element 116 can be efficiently arranged to reduce the size of the light-receiving element 116 and reduce the cost of the apparatus.

As described above, the focus detection apparatus 100 of the present embodiment can realize the cross focus detection over a wide range within the image-pickup region while the focus detection points are arranged with high priority to the composition in picking up images. The focus detection apparatus 100 realizes the cross focus detection with the plurality of cross focus detection points by using the lens portions 111b and 111c of the split field lens decentered from the optical axis of the image-pickup lens 10. This eliminates the need to provide a new optical member for preventing overlapping of optical images on the photoelectrical conversion elements (that is, the sensor arrays of the light-receiving element 116) or to increase the optical path length, thereby avoiding an increased size and a higher cost of the focus detection apparatus 100. In addition, the abovementioned arrangement of the focus detection areas allows the focus detection apparatus 100 to realize the cross focus detection without sacrificing the focus detection accuracy and the lower limit of luminance.

Returning to FIG. 1, the controller 80 controls the focusing lens included in the image-pickup lens 10 based on the focusing state (the direction and the amount of defocus) of the image-pickup lens 10 detected by the focus detection apparatus 100 to adjust the focusing state of the image-pickup lens 10. Specifically, the controller 80 calculates the drive amount of the focusing lens based on the direction and the amount of defocus of the image-pickup lens 10 and transmits the calculation result to a controller in the an image-pickup lens, not shown. The controller in the image-pickup lens drives the focusing lens through a motor or the like based on the drive amount of the focusing lens transmitted from the controller 80.

The operation of the image-pickup apparatus 1 will be described. When a user observes an image through the viewfinder, light transmitted through the image-pickup lens 10 is reflected by the main mirror 20, forms an image on the focal plane plate 32, and is observed through the pentaprism 34 and the ocular lens 36. Light transmitted through the main mirror 20 is reflected by the sub mirror 40 and enters the focus detection apparatus 100. As described above, the focus detection apparatus 100 can accurately detect the focusing state of the image-pickup lens 10. Based on the detection result, the controller 80 and the controller in the image-pickup lens, not shown, drive the focusing lens included in the image-pickup lens 10 to achieve focus.

On the other hand, when an image is picked up (an image for recording is picked up), the main mirror 20 and the sub mirror 40 are retracted from the image-pickup optical path, and light transmitted through the image-pickup lens 10 is formed into an image by the image-pickup element 50. The image-pickup apparatus 1 can accurately detect the focusing state of the image-pickup lens 10 with the focus detection apparatus 100 and adjust the focusing state of the image-pickup lens 10 based on the detection result, so that images can be picked up with high quality. As described above, an increased size and a higher cost can be prevented in the focus detection apparatus 100. Therefore, an increased size and a higher cost can also be prevented in the image-pickup apparatus 1 in which the focus detection apparatus 100 is used.

In other words, according to the present embodiment, it is possible to provide the focus detection apparatus which can avoid an increased size and a higher cost and achieve excellent focus detection performance to accurately detect the focusing state of the image-pickup optical system, and the image-pickup apparatus including the focus detection apparatus.

While the preferred embodiment of the present invention has been described, it goes without saying that the present invention is not limited to the abovementioned embodiment and various modifications and variations may be made without departing from the spirit or scope of the present invention.

This application claims foreign priority benefits based on Japanese Patent Application No. 2005-331245, filed on Nov. 16, 2005, which is hereby incorporated by reference herein in its entirety as if fully set forth herein.

What is claimed is:

1. A focus detection apparatus configured to detect a focusing state of an image-pickup lens based on a phase difference in a plurality of images provided by splitting a luminous flux from the image-pickup lens, comprising:
   a field lens configured to have one optical axis and to split the luminous flux from the image-pickup lens, the field lens being decentered from an optical axis of the image-pickup lens; and
   a light-receiving element configured to include a plurality of focus detection areas for photoelectrically converting a plurality of paired images formed of the luminous flux passed through the field lens,
   wherein the light-receiving element includes:
   at least a first focus detection area and a second focus detection area which detect a phase difference in a first direction; and a third focus detection area and a fourth focus detection area which detect a phase difference in a second direction different from the first direction, and
   wherein the first focus detection area and the third focus detection area intersect with each other at a position on a first side with respect to a center of the first focus detection area, and the second focus detection area and the fourth focus detection area intersect with each other at a position on a second side opposite to the first side with respect to a center of the second focus detection area.

2. The focus detection apparatus according to claim 1, wherein the second focus detection area is closer to the optical axis of the image-pickup lens than the first focus detection area in the first direction.

3. The focus detection apparatus according to claim 1, wherein the intersection position of the first focus detection area and the third focus detection area is closer to the optical axis of the image-pickup lens than the center of the first focus detection area in the first direction, and the intersection position of the second focus detection area and the fourth focus detection area is farther from the optical axis of the image-pickup lens than the center of the second focus detection area in the first direction.

4. The focus detection apparatus according to claim 1, wherein the first focus detection area and the second focus detection area are placed alternately in a direction orthogonal to the decentering direction of the field lens from the optical axis of the image-pickup lens.

5. The focus detection apparatus according to claim 1, wherein the decentering direction of the field lens from the optical axis of the image-pickup lens is one of the horizontal direction and the vertical direction on an image-forming plane of the image-pickup lens.

6. An image-pickup apparatus which picks up an object image through an image-pickup lens, comprising:
   the focus detection apparatus according to claim 1;
   an image-pickup element which picks up the object image by driving the image-pickup lens to output an image signal based on a detection result of the focus detection apparatus;
   an A/D converter which performs analog-to-digital conversion of the image signal; and
   a recording controller which controls recording of a signal output from the A/D converter on a recording medium.

7. A focus detection apparatus configured to detect a focusing state of an image-pickup lens based on a phase difference in a plurality of images provided by splitting a luminous flux from the image-pickup lens, comprising:
   a light-receiving element configured to include a plurality of focus detection areas for photoelectrically converting a plurality of paired images formed of the luminous flux passed through a field lens,
   wherein the light-receiving element includes: a first focus detection area and a second focus detection area which detect a phase difference in a first direction; and a third focus detection area and a fourth focus detection area which detect a phase difference in a second direction different from the first direction, and
   wherein the first focus detection area and the third focus detection area intersect with each other at a position on a first side with respect to a line connecting a center of the first focus detection area and a center of the second focus detection area, and the second focus detection area and the fourth focus detection area intersect with each other at a position on a second side opposite to the first side with respect to the line.

8. The focus detection apparatus according to claim 7, wherein, in a case where the intersection position of the first focus detection area and the third focus detection area matches the center of the first focus detection area and the intersection position of the second focus detection area and the fourth focus detection area matches the center of the second focus detection area, the third and fourth focus detection areas overlap with each other.

9. An image-pickup apparatus which picks up an object image through an image-pickup lens, comprising:
   the focus detection apparatus according to claim 7;
   an image-pickup element which picks up the object image by driving the image-pickup lens to output an image signal based on a detection result of the focus detection apparatus;
   an A/D converter which performs analog-to-digital conversion of the image signal; and
   a recording controller which controls recording of a signal output from the A/D converter on a recording medium.

* * * * *